United States Patent [19]
Fukumoto et al.

[11] Patent Number: 5,774,198
[45] Date of Patent: Jun. 30, 1998

[54] LIQUID CRYSTAL DISPLAY DEVICE WITH DIFFERENT ALIGNMENT THICKNESS ON OPPOSITE SUBSTRATE

[75] Inventors: Hirohide Fukumoto; Junichi Ushirono, both of Kagoshima; Minoru Nakano; Hideo Kataoka, both of Kanagawa, all of Japan

[73] Assignee: Sony Corporation, Tokyo, Japan

[21] Appl. No.: 552,805

[22] Filed: Nov. 3, 1995

[30] Foreign Application Priority Data

Nov. 15, 1994 [JP] Japan .................................. 6-307033

[51] Int. Cl.⁶ .................... G02F 1/1335; G02F 1/1337
[52] U.S. Cl. .................... 349/128; 349/106; 349/123
[58] Field of Search .................... 359/75, 76, 68; 528/353; 349/123, 124, 106, 128

[56] References Cited

U.S. PATENT DOCUMENTS

| | | | |
|---|---|---|---|
| 4,802,743 | 2/1989 | Takao et al. | 359/75 |
| 4,939,003 | 7/1990 | Aoki et al. | 359/75 |
| 5,309,263 | 5/1994 | Sato | 359/79 |
| 5,427,829 | 6/1995 | Mochizuki et al. | 359/75 |
| 5,465,169 | 11/1995 | Eguchi | 359/74 |
| 5,498,762 | 3/1996 | Eguchi | 359/76 |
| 5,539,553 | 7/1996 | Tsukamoto et al. | 359/76 |
| 5,578,697 | 11/1996 | Kawamonzen et al. | 528/353 |

FOREIGN PATENT DOCUMENTS

| | | |
|---|---|---|
| 449 047 | 10/1991 | European Pat. Off. . |
| 601 813 | 6/1994 | European Pat. Off. . |
| 04 044012 | 5/1992 | Japan . |

*Primary Examiner*—William L. Sikes
*Assistant Examiner*—Julie Ngo
*Attorney, Agent, or Firm*—Ronald P. Kananen

[57] ABSTRACT

A liquid crystal display device minimized in image retention phenomenon, comprising: a first insulating substrate having a plurality of pixel electrodes arranged in a matrix and a first alignment film provided on the inner surface thereof, said insulating substrate comprising a plurality of thin film transistors associated with each of the pixel electrodes; a second insulating substrate disposed opposed to the first insulating substrate, said second insulating substrate having facing electrodes and a second alignment film formed on the inner surface thereof; a liquid crystal layer interposed between the first and the second insulating substrates; and at least one of the first and the second alignment films having a thickness of 60 nm or less.

8 Claims, 2 Drawing Sheets

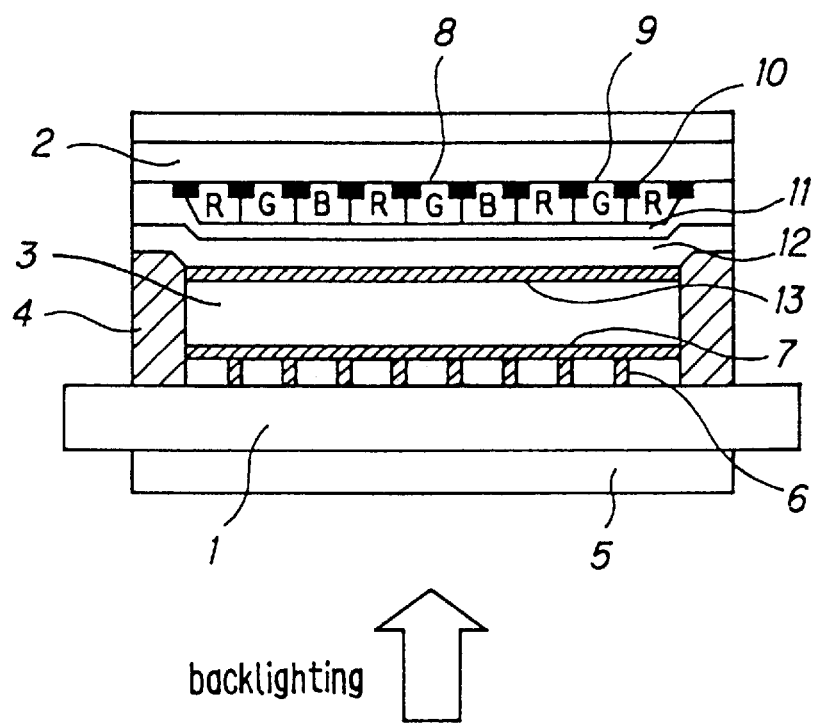

LIQUID CRYSTAL DISPLAY DEVICE WITH DIFFERENT ALIGNMENT THICKNESS ON OPPOSITE SUBSTRATE

BACKGROUND OF THE INVENTION

The present invention relates to a liquid crystal display device, and more particularly, to an improved liquid crystal display device in which an image retention phenomenon is prevented from occurring on the display image plane.

A liquid crystal display device having a thin film transistor (TFT) comprises a pair of glass substrates with a liquid crystal sealed therebetween. In the liquid crystal display device of this type, a desired image is displayed on an image plane by driving and aligning the liquid crystal in the particular pixel portion in a predetermined direction, thereby transmitting or cutting off the backlight. In such a type of liquid crystal display device, the pixel electrodes and the TFTs are formed on one of the pair of the glass substrates, and generally, a color filter is formed on the other glass substrate. Furthermore, an alignment film made of a resin material such as polyimide or PVA, or an inorganic material is formed on each of the glass substrates. The alignment film is generally provided at a thickness of about 80 nm, and is subjected to rubbing treatment after forming it on the substrate by means of a printing process and the like.

However, a problem of image retention phenomenon is found to occur in a conventional liquid crystal display device having a TFT as described above. That is, in case the display is instantaneously switched off after a given display pattern is displayed continuously for a certain duration of time, the display pattern is found to remain on the image plane even after the display is switched off. The TFTs are driven by alternating current (AC), however, when a still image plane is displayed for a long duration of time, the direct current (DC) component accumulates to disable the liquid crystal shutter. This malfunction occurs assumably due to the charge accumulated in the alignment film. That is, the charge in the alignment film adsorbs ions from inside the liquid crystal that is filled between the two glass substrates and forms an electric double layer.

The image retention phenomena in a conventional liquid crystal display device is illustrated in FIGS. 2 (A) to 2 (C). Referring to FIG. 2 (A), a first image pattern 2 is continuously displayed in a liquid crystal display image plane 1 for a predetermined duration of time. As is shown in FIG. 2 (B), when the image plane 1 is switched off, the afterimage of the first pattern remains as a retained image pattern 3 in the display image plane 1. When a new image pattern 4 is displayed, as is shown in FIG. 2 (C), the new image pattern is displayed on the still remaining retained image pattern 3 to provide an unclear display. Thus, it can be readily understood that the image quality is greatly impaired.

The present invention has been accomplished in the light of the aforementioned circumstances. Accordingly, an object of the present invention is to provide a liquid crystal display device having TFTs, said liquid crystal display device characterized in that the image retention phenomenon is prevented from occurring.

SUMMARY OF THE INVENTION

According to an aspect of the present invention, the object above can be accomplished by a liquid crystal display device comprising: a first insulating substrate having a plurality of pixel electrodes arranged in a matrix and a first alignment film provided on the inner surface thereof, said insulating substrate comprising a plurality of thin film transistors associated with each of the pixel electrodes; a second insulating substrate disposed opposed to the first insulating substrate, said second insulating substrate having facing electrodes and a second alignment film formed on the inner surface thereof; a liquid crystal layer interposed between the first and the second insulating substrates; and at least one of the first and the second alignment films having a thickness of 60 nm or less.

Preferably, at least one of the first and the second alignment films has a thickness of 50 nm or less, more preferably, 45 nm or less.

In another aspect according to the present invention, there is provided a liquid crystal display device above, provided that the second alignment film is thinner than the first alignment film.

The second insulating substrate may comprise a color filter on the inner surface thereof.

The first insulating substrate may comprise a color filter on the inner surface thereof.

Thus, in the present invention, the alignment film is provided thinner than a conventional one, at a thickness of 60 nm or less, preferably at a thickness of 50 nm or less, and more preferably, 45 nm or less, thereby reducing the charge accumulation and suppressing the generation of image retention phenomenon.

BRIEF DESCRIPTION OF THE DRAWINGS

FIG. 1 is a cross-sectional view of a color liquid crystal display device according to the present invention.

DETAILED DESCRIPTION OF THE PREFERRED EMBODIMENT

Figure 2A:
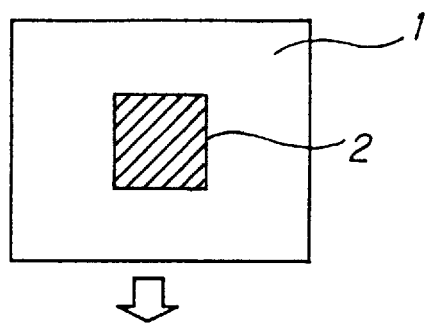
FIGS. 2(A) to 2(C) are explanatory diagrams illustrating the image retention phenomenon.
Figure 2B:
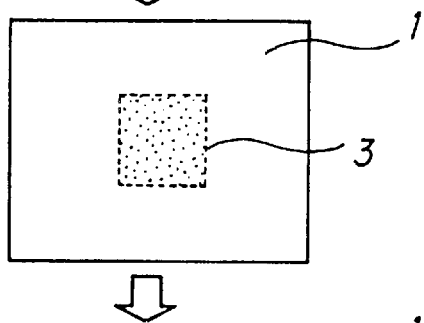
Figure 2C:
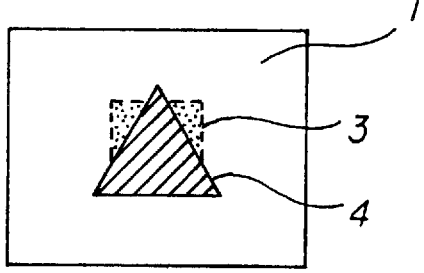

FIG. 1 is a cross sectional view showing the constitution of a liquid crystal display device according to the present invention. Referring to FIG. 1, the basic constitution of the liquid crystal display device comprises a pair of first glass substrate 1 and a second glass substrate 2 disposed opposite to each other, with a liquid crystal 3 filled therebetween. The liquid crystal 3 is sealed by a sealing resin 4 which also functions as a spacer, provided to the peripheral edge of the glass substrates 1 and 2. The first glass substrate 1 comprises a polarizer sheet 5 provided on the outer surface thereof and a TFT 6 which functions as a switching element for driving the pixel electrode formed on the inner surface of thereof. An alignment film 7 is formed on the upper surface of the TFT 6. The alignment film 7 can be provided by using a resin material such as polyimide or PVA, or by using an inorganic material. The alignment film 7 can be formed by a known method such as printing, spin coating, oblique evaporation, LB (Langmuir - Blodgett) method, etc.

A color filter 8 is formed on the inner surface of the second glass substrate 2. The color filter 8 comprises a light shielding portion (black mask) 10 and a colored layer 9 consisting of R (red), G (green), and B (blue) color element portions. A transparent electrode (ITO) 12 is formed over the entire surface of the color filter 8 with a protective layer 11 interposed therebetween, and an alignment film 13 is formed further thereon in the same manner as in the first glass substrate 1.

The level of image retention as evaluated visually can be improved by changing the alignment films 7 and 13 in such a manner that the thickness of the films 7 and 13 be 50 nm each, or that the thickness of the films be 60 nm and 50 nm, respectively. Furthermore, the level of image retention is considerably improved by changing the thickness of the alignment films 7 and 13 to 50 nm and 30 nm, respectively, or to 75 nm and 30 nm, or to 45 nm and 30 nm. The film thickness is controlled and selected depending on the type of the liquid crystal display device and the kind of TFT, on the dimension of the components constituting the device, on the use, and on various other conditions so that no image retention phenomenon occurs. Furthermore, the alignment film corresponding to the desired regions of the glass substrate may be thinned. A thin alignment film can be readily obtained by diluting the alignment film material, printing the resulting material on the substrate, and then baking the printed material or simply removing the solvent therefrom. The present invention is also effective in case of a liquid crystal display device comprising a glass substrate having a color filter formed on the side of the active matrix substrate provided thereon a pixel electrode and a thin film transistor, and a facing glass substrate disposed opposed to said glass substrate.

As described in the foregoing, the liquid crystal display device according to the present invention is characterized in that the film thickness of the alignment film is reduced from the conventionally utilized thickness of about 80 nm to 60 nm or less, preferably to 50 nm or less, and more preferably, to 45 nm or less. Accordingly, the charge accumulation in the alignment film can be reduced and the image retention phenomenon can be thereby prevented from occurring. Thus, as a result, a liquid crystal display device with improved image quality can be obtained. Furthermore, the cost of the alignment film material can be lowered.

While the invention has been described in detail and with reference to specific embodiments thereof, it will be apparent to one skilled in the art that various changes and modifications can be made therein without departing from the spirit and scope thereof.

What is claimed is:

1. A liquid crystal display device comprising:

a first insulating substrate having a plurality of pixel electrodes arranged in a matrix and a first alignment film provided on the inner surface thereof, said insulating substrate comprising a plurality of thin film transistors associated with each of the pixel electrodes;

a second insulating substrate disposed opposed to the first insulating substrate, said second insulating substrate having facing electrodes and a second alignment film formed on the inner surface thereof;

a liquid crystal layer interposed between the first and the second alignment films; and one of the first and the second alignment films having a thickness which is less than 60 nm and effective to minimize image retention and the other of the first and second alignment films having a thickness of approximately 30 nm.

2. A liquid crystal display device as claimed in claim 1, wherein said one of the first and the second alignment films has a thickness which is equal to or less than 50 nm and effective to minimize image retention.

3. A liquid crystal display device as claimed in claim 1, wherein said one of the first and the second alignment films has a thickness which is equal to or less than 45 nm and effective to minimize image retention.

4. A liquid crystal display device as claimed in claim 1, wherein said first and second alignment films have different thicknesses.

5. A liquid crystal display device as claimed in claim 1, wherein the second insulating substrate comprises a color filter on the inner surface thereof.

6. A liquid crystal display device as claimed in claim 1, wherein the first insulating substrate comprises a color filter on the inner surface thereof.

7. A liquid crystal display device comprising:

a liquid crystal layer;

a first alignment film formed on a first side of the liquid crystal, said first alignment film having a thickness of 75 and 30 nm;

a second alignment film formed on a second side of the liquid crystal, said second alignment film having a thickness of 30 nm.

8. A liquid crystal display device as claimed in claim 7, further comprising:

a transparent electrode formed over the first alignment film;

a protective layer formed over the transparent electrode;

a color filter formed on the protective layer;

a first insulating substrate formed over the color filter;

a second insulating substrate disposed over the second alignment film; and switching means disposed between the second alignment film and the second insulating substrate for driving pixel electrodes.

* * * * *